March 29, 1927. 1,622,438
R. D. FRITZ
APPARATUS FOR VULCANIZING UNDER FLUID PRESSURE
Filed Jan. 12, 1926   2 Sheets-Sheet 2

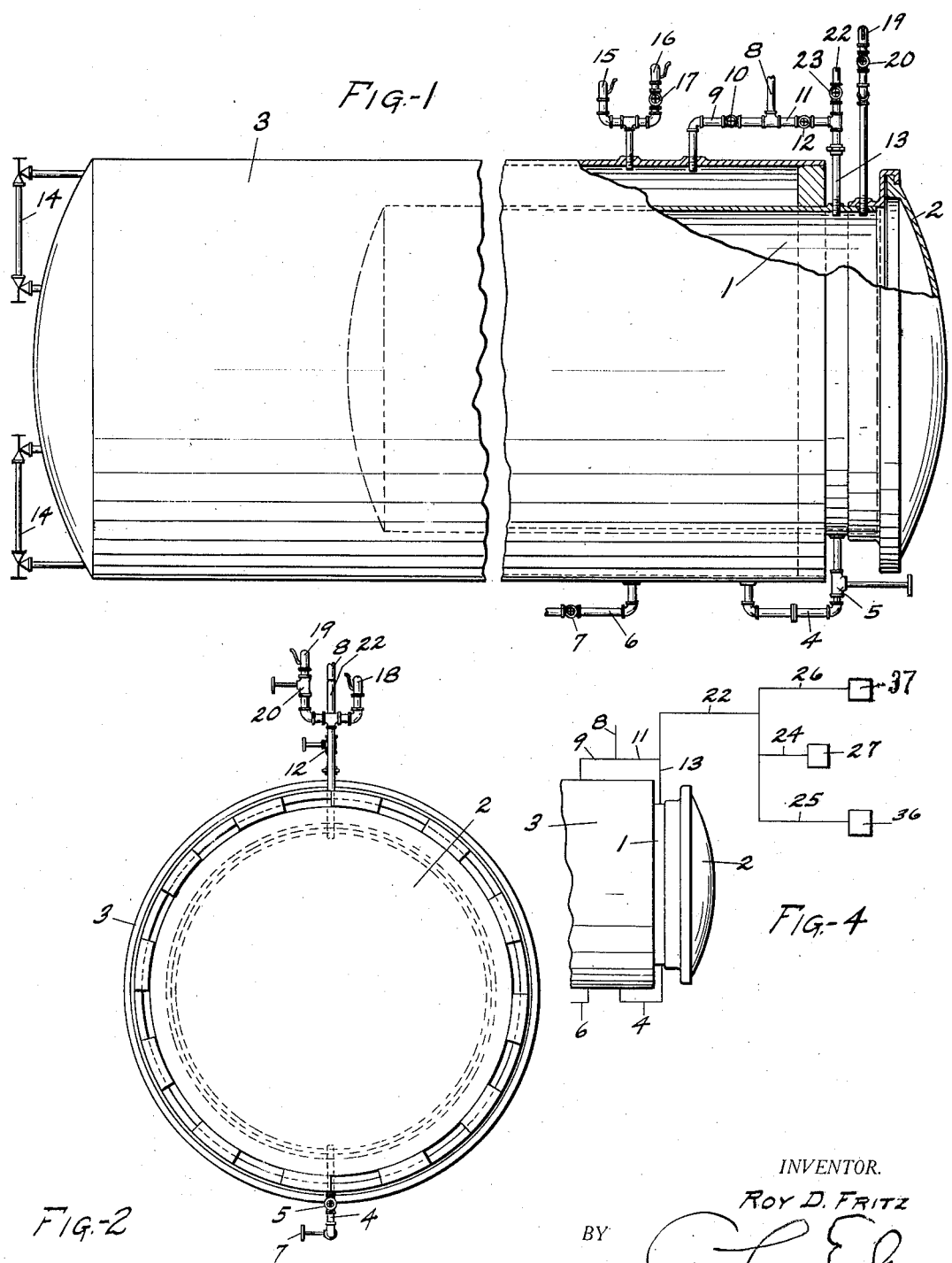

INVENTOR.
Roy D. Fritz
BY
ATTORNEY.

Patented Mar. 29, 1927.

1,622,438

UNITED STATES PATENT OFFICE.

ROY D. FRITZ, OF BARBERTON, OHIO, ASSIGNOR, BY DIRECT AND MESNE ASSIGNMENTS, TO THE B. F. GOODRICH COMPANY, OF NEW YORK, N. Y., A CORPORATION OF NEW YORK.

APPARATUS FOR VULCANIZING UNDER FLUID PRESSURE.

Application filed January 12, 1926. Serial No. 80,713.

The present invention relates to an apparatus for the vulcanization of rubber goods, such, for example, as inner tubes, in which the articles are placed within a closed chamber or heater and subjected to the action of water under pressure and at a sufficiently high temperature to effect vulcanization. The object of the invention is to improve upon apparatus of this nature in order to simplify and cheapen the installation, and to perfect a safe and easily operated mechanism for the uses and purposes set forth.

The present invention utilizes water at a temperature above the boiling point and under pressure for the vulcanization of the rubber articles within the heater, as has been old and well known in the art for many years, but does not employ a plurality of vulcanizers and a central storage receptacle from which the vulcanizers receive preheated water.

The present invention employs an individual unit as a vulcanizer having a chamber in which the articles are placed and an outer jacket, the capacity of which is equal to or slightly greater than the capacity of the vulcanizing chamber. Water is supplied to the outer jacket and, as required, is conducted into the vulcanizing chamber where it is heated to the required vulcanizing temperature and subjected to the proper pressure to effect vulcanization. Associated with the apparatus are suitable control devices to maintain the pressure during vulcanization.

The apparatus shown herein presents many advantages over devices and mechanisms of the prior art, particularly in simplicity and safety, as will be apparent to those skilled in the art. The invention is shown and described in detail, but it will be obvious that the details may be varied, and modifications may be made within the scope of the invention as set forth in the appended claims.

In the drawings in which one embodiment of the invention is shown:

Figure 1 is a side view of a heater for vulcanizing tubes or similar articles, partly in section;

Figure 2 is an end view thereof;

Figure 4 is a diagrammatic view of the pipe connections from the heater inlet to the control mechanism.

Figure 3:
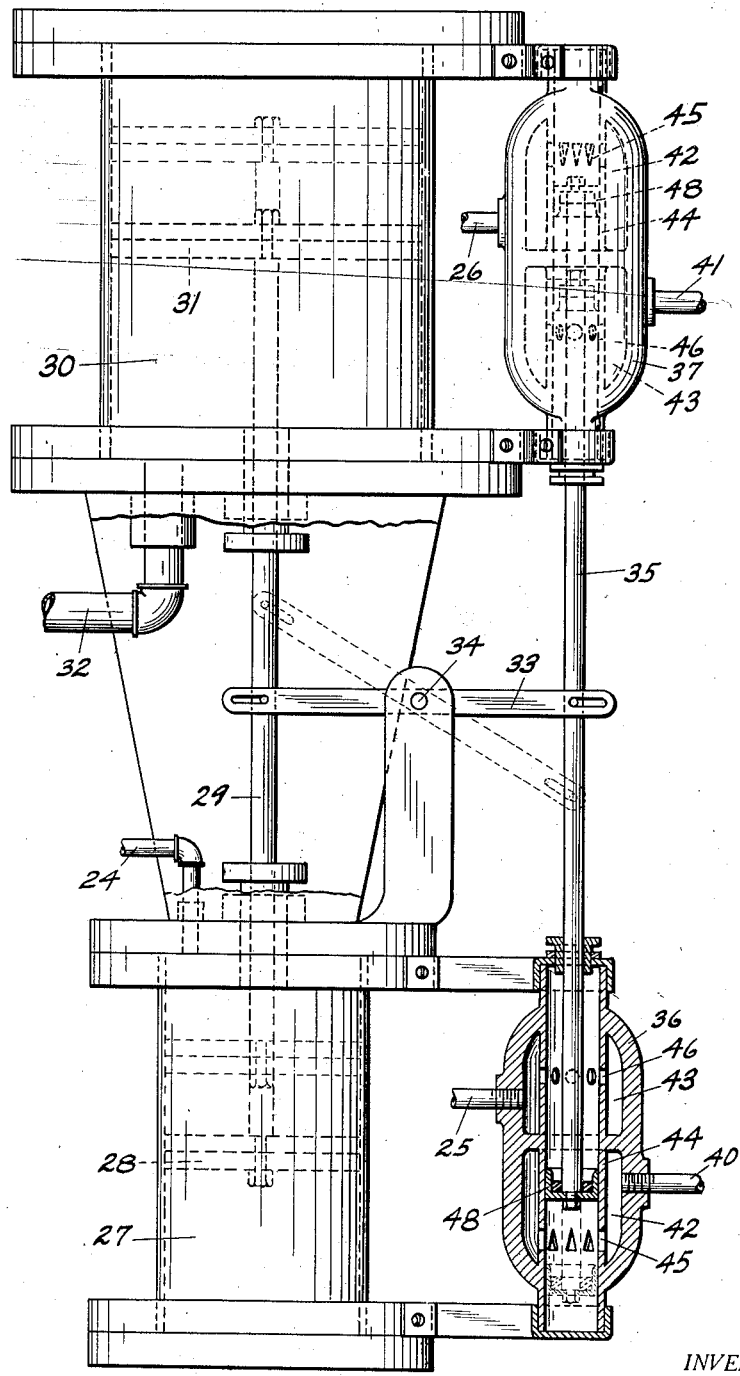
Figure 3 is a view of the control mechanism for maintaining the pressure within the vulcanizer during the vulcanizing operation, one of the valves being shown in section.

The vulcanizing chamber is indicated by the numeral 1, being an elongated heater and being closed at its outer end by a door 2 of the usual construction as is well known in the art, said door being securely locked and adapted to withstand heavy pressures from within. Except for the small portion of the inner chamber or vulcanizer proper 1 which extends outwardly adjacent the door, the vulcanizing chamber is surrounded by an outer jacket 3, the cubical contents or capacity of the outer jacket being substantially equal to the cubical contents or capacity of the chamber 1, so that the volume of water required to fill the chamber may be all received within the jacket. It may be advisable to have a capacity for the jacket slightly greater than for the vulcanizer so as to insure a complete filling of the vulcanizing chamber.

In order to transfer the water from the jacket 3 to the vulcanizer 1, piping 4 is arranged as shown in Figure 1, a valve 5 being located in the piping. Steam is admitted to the jacket through line 6 controlled by valve 7. Steam for displacing the water from either the jacket or the vulcanizing chamber is admitted through the pipe 8, a branch 9 extending to the jacket controlled by a valve 10. A second branch 11 having valve 12 therein, leads from the line 8 to a pipe 13 which communicates with the interior of the vulcanizing chamber.

Suitable gages 14 are mounted on the outer jacket and relief or safety valves 15 and 16 are also mounted on the jacket, the former being for relief of pressure during the operation of the apparatus, and the latter being set to relieve the air from the interior of the jacket during the transfer of water to the jacket from the vulcanizing chamber. A valve 17 may be provided just below the relief valve 16, this valve being opened only during the transfer of water to the jacket. A safety valve 18, similar to the valve 15, and a relief valve 19 having valve 20 therewith similar to valve 16 are arranged to communicate with the interior of the vulcanizing chamber, the former being operative during the vulcanization of articles within the chamber and the latter being operative during the transfer of water to the vulcanizing chamber to relieve the air therein as it is displaced by the water.

An extension of the line 13, designated at 22 and having a valve 23 therein, is used for the purpose of maintaining a constant pressure within the vulcanizing chamber as is shown in Figures 3 and 4.

The line 22 is divided into three branches 24, 25 and 26, as shown in Figure 3. The line 24 extends to the upper end of a cylinder 27 in which is mounted a piston 28, the rod 29 of which extends through suitable packings and into a second cylinder 30, a piston 31 being attached to the opposite end of the rod within the cylinder 30. A constant pressure line 32 communicates with the cylinder 30 below the piston 31 so as to balance against the pressure within the vulcanizing chamber.

At a midway point between the cylinders 27 and 30, a lever 33 is pivoted, this lever rocking on a center 34 and being pivotally connected at its other end to the vertically movable rod 35. It will be seen that if the pressure within the vulcanizing chamber falls below the fixed pressure maintained through the pipe 32, the rod 29 will move upwardly, and if the pressure within the vulcanizing chamber increases over the fixed pressure, the rod will move downwardly. The rod 35 moves in unison with the rod 29, but in opposite directions.

The rod 35 controls valves 36 and 37, the former admitting water under pressure higher than that to be maintained within the vulcanizer through supply pipe 40 from an accumulator or other source of pressure to the line 25. The line 26 communicates with the drain 41 through the valve 37. The valves 36 and 37 may be of any suitable construction, that shown in Figure 3 comprising two chambers 42 and 43 connected by pipe 44 having passages 45 and 46 connecting with the chambers 42 and 43 respectively. A plunger 48 on each end of the rod 35 is mounted to reciprocate in the pipe 44 past the openings 45 when the pressure within the vulcanizing chamber varies to establish communication from the pressure supply line 40 or the drain 41 selectively.

The operation of the apparatus will be readily understood without further extended description. When the vulcanizing chamber is open, the valves 5, 12 and 23 are closed. When the vulcanizer is loaded with articles to be cured, the door is closed and tightly locked. The outer jacket being filled with water, the valve 5 is opened and the water will pass through the pipe 4, the air within the vulcanizing chamber being relieved through the valve 19. Steam under pressure is admitted to the jacket 3 through the pipe 9 and valve 10 and forces the water from the jacket to the vulcanizing chamber until substantially all of the water contained in the jacket is passed to the chamber and the latter is filled. The valve 10 is now closed and steam is admitted to the jacket through the pipe 6 and valve 7 to heat the interior of the jacket and through the jacket to heat the water within the vulcanizing chamber to the required temperature to effect vulcanization.

Pressure at about 200 pounds upon the water controlled by the fixed pressure at pipe line 32 is maintained through the balanced valves 36 and 37 as has been explained. The temperature of the water during vulcanization is preferably maintained at from 290° to 310° F.

What is claimed is:

1. In an apparatus for vulcanizing rubber articles under water at high temperatures and pressures, a vulcanizing chamber, a jacket surrounding the chamber, the capacities of the chamber and jacket being substantially equal, and means to transfer water between the jacket and the chamber.

2. In an apparatus for vulcanizing rubber articles under water at high temperatures and pressures, a vulcanizing chamber, a jacket surrounding the chamber, the capacities of the chamber and jacket being substantially equal, a pipe to transfer water between the jacket and the chamber, and means to admit steam to the interior of the jacket after the water has been transferred to the chamber.

3. In an apparatus for vulcanizing rubber articles under water, a chamber, a jacket surrounding the chamber of substantially the same capacity as the chamber, a direct connection between the chamber and the jacket, and means for forcing the water through said connection in either direction.

4. In an apparatus for vulcanizing rubber articles under water, a chamber, a jacket surrounding the chamber of substantially the same capacity as the chamber, a direct connection between the chamber and the jacket, means for forcing the water through said connection in either direction, and means for heating the interior of the jacket after the water has been passed to the chamber.

5. A vulcanizing apparatus comprising a vulcanizing chamber, a jacket surrounding the chamber, the capacity of said elements being substantially equal, a pipe connecting the vulcanizing chamber and the jacket at the lowest points thereof, a pressure line, and connections from said pressure line to the jacket and chamber, respectively, to force water from one to the other.

6. A vulcanizing apparatus comprising a vulcanizing chamber, a jacket surrounding the chamber, the capacity of said elements being substantially equal, a pipe connecting the vulcanizing chamber and the jacket at the lowest points thereof, a pressure line, connections from said pressure line to the jacket and chamber, respectively, to force water from one to the other, and means to heat the interior of the jacket and thereby the contents of the chamber.

7. A vulcanizing apparatus comprising a vulcanizing chamber, a jacket surrounding the chamber, a pipe connecting the vulcanizing chamber and the jacket at the lowest points thereof, a pressure line, and connections from said pressure line to the jacket and chamber, respectively, to force water from one to the other.

8. A vulcanizing apparatus comprising a vulcanizing chamber, a jacket surrounding the chamber, a pipe connecting the vulcanizing chamber and the jacket at the lowest points thereof, a pressure line, connections from said pressure line to the jacket and chamber, respectively, to force water from one to the other, and means to heat the interior of the jacket and thereby the contents of the chamber.

9. A complete vulcanizing unit comprising a jacket and a vulcanizing chamber therein, a connection between said jacket and chamber, and means to force water from the jacket to the chamber.

10. A complete vulcanizing unit comprising a jacket and a vulcanizing chamber therein, and means for supplying the chamber with water from the jacket without drawing upon any other source of supply.

11. A complete vulcanizing unit comprising a jacket and a vulcanizing chamber therein, means for supplying the chamber with water from the jacket without drawing upon any other source of supply, and means for heating the interior of the jacket.

ROY D. FRITZ.